UNITED STATES PATENT OFFICE.

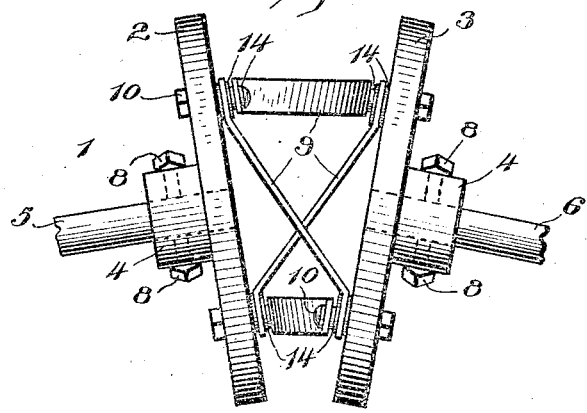
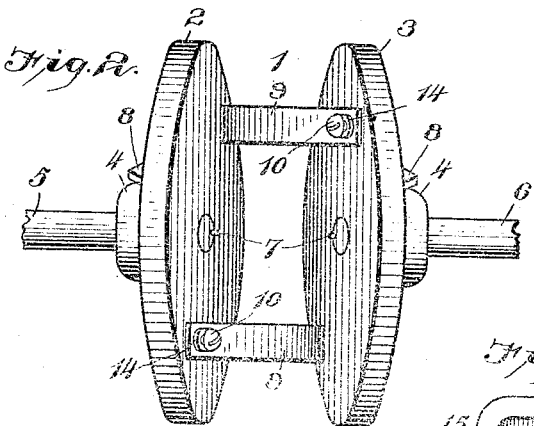
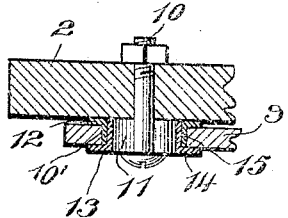
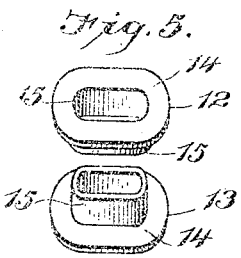
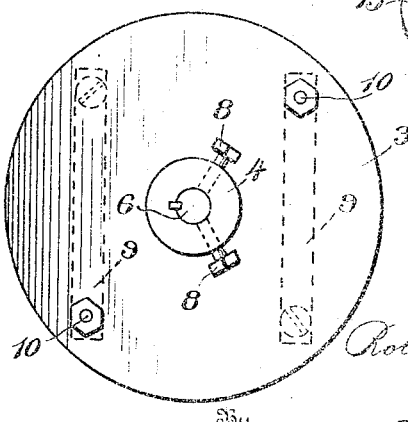

ROBERT LEE LOWRY, OF LOUISVILLE, KENTUCKY, ASSIGNOR OF ONE-HALF TO HARRY B. DRIVER, OF LOUISVILLE, KENTUCKY.

SHAFT-COUPLING.

No. 854,426.
Specification of Letters Patent.
Patented May 21, 1907.

Application filed October 9, 1905. Serial No. 281,892.

*To all whom it may concern:*

Be it known that I, ROBERT LEE LOWRY, a citizen of the United States, residing at Louisville, in the county of Jefferson and State of Kentucky, have invented certain new and useful Improvements in Shaft-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to "shaft-couplings," and has for its object to provide a flexible coupling for the transmission of power which is suitable for connecting an electric motor to a fan, or for connecting shafting of any length or kind in such manner that the coupling takes up all vibration and relieves the friction on boxes, hangers etc., even though the sections coupled be out of alinement or at an angle to each other.

A further object of my invention is to provide a non-conducting as well as a conducting shaft-coupling which makes the coupling particularly adapted for coupling shafts of electrical apparati, such as electric motors etc., whenever it is necessary or desired to insulate the shaft section which is coupled to the electrical apparatus.

With these objects in view, my invention consists in the novel construction of the disks and connecting straps of the coupling; and my invention further consists in the construction for securing the connecting straps to the coupling disks, providing for adjusting said connecting straps or for allowing them a longitudinal movement as when coupling two shaft sections which are at quite an angle to each other.

Referring to the accompanying-drawing: Figure 1, is a side elevation showing the coupling in position for coupling two shafts which are at an angle to each other; four connecting straps being illustrated. Fig. 2, is a perspective view of coupling showing only two connecting straps. Fig. 3, is an elevation of one of the coupling disks. Fig. 4, is a fragmentary sectional view through disk and end of connecting strap showing slotted construction of strap, and Fig. 5, is a perspective view of the slot-lining.

Like numerals of reference indicate the same parts throughout the several figures, in which:

1, indicates the coupling, which comprises the two disks or coupling members 2 and 3 either of which may be the driving member, and either of which may be the driven member; said disks being provided with a central flange or collar 4, into which the shaft-sections 5 and 6 extend; said shaft-sections being secured in position in any suitable manner, as by a key 7 or set-screws 8 as shown.

9 indicates the connecting straps which are constructed of rubber, leather belting, or other suitable non-conducting material whenever it is desired to make the coupling non-conductive; or steel spring, chain, wire-cable, or any suitable strong but yielding material may be employed for a conductive coupling. As shown in Fig. 2, only two connecting straps are employed, as that number is sufficient where the shaft is to revolve in one direction only. If however the shaft is to revolve in both directions, four connecting straps or links placed in a circuit are required as shown in Fig. 1, two of the straps acting while the shaft is revolving in one direction, and two acting while the shaft is revolving in the opposite direction as is obvious.

The connecting straps or links are secured to the faces of the coupling disks preferably by means of bolts 10, the ends of the straps or links overlapping each other, said bolts passing through alternate overlapping ends into the driving member, which may be either member, and said bolts passing through the remaining overlapping ends into the driven member, which may be either member, as shown in Fig 1 and the straps are provided with slots 10' at one or both ends thereof through which the bolts pass. By this means the straps may be lengthened or shortened as desired to meet existing conditions, or the straps may be loosely held by the bolts so as to allow a sliding longitudinal movement of the straps as has been found expedient when coupling two shaft-sections which are at quite an angle to each other.

When employing connecting straps of a non-conducting material, I provide a metal lining 11 for the slots in the connecting straps so as to stiffen the straps at their ends, reducing friction and protecting the straps from cutting or chafing from wear on the securing bolts; said lining 11 comprising two sections 12 and 13, each of which is provided with a flange 14 and a wall 15, the sections being constructed so that the wall of one enters the wall of the other; thus providing a metal lining of double thickness within the slot of the strap, the flanges 14 on the lining sections protecting the straps from the heads of the securing bolts and from friction with the faces of the disks.

What I claim as my invention and desire to secure by Letters Patent of the United States, is:

1. In a flexible coupling, the combination of two disks arranged to be secured to the shaft-sections to be coupled, a plurality of connecting straps secured to said disks, said connecting straps being provided with slots through which the securing means pass, and linings for said slots, substantially as described.

2. In a flexible coupling, the combination of two coupling members, and connecting straps secured to said coupling members, said connecting straps being provided with slots through which the securing means pass, substantially as described and for the purposes set forth.

3. In a flexible coupling, the combination of a plurality of coupling members, connecting straps secured thereto and means for allowing said straps to move longitudinally on said coupling members, substantially as described.

In testimony whereof, I affix my signature, in presence of two witnesses.

ROBERT LEE LOWRY.

Witnesses:
PHIL T. GERMAN, Jr.,
WILLIAM F. MORRISON.